United States Patent [19]

Mori et al.

[11] 3,752,937

[45] Aug. 14, 1973

[54] MAGNETIC-RECORDING AND REPRODUCING APPARATUS WHICH IS AUTOMATICALLY PLACED IN FORWARD MODE AFTER RESPONSE TO A PREVIOUS CONTROL SIGNAL

[75] Inventors: Keijiro Mori, Sakai-shi; Akito Sugahara, Yokohama; Kozo Yamamoto, Osaka; Yukio Takeda, Neyagawa-shi, all of Japan

[73] Assignee: Matsushita Electric Industiral Co., Ltd., Osaka, Japan

[22] Filed: May 14, 1971

[21] Appl. No.: 143,471

[30] Foreign Application Priority Data

May 18, 1970 Japan ............................... 45/43021

[52] U.S. Cl. ........................... 179/100.2 S, 35/35 C

[51] Int. Cl. . G11b 27/22, G11b 27/28, G11b 15/44

[58] Field of Search ........... 179/100.2 S, 100.2 MD, 179/100.2 R, 100.1 VC, 100.1 PS; 340/174.1 C, 174.1 H; 35/35 C, 35 G

[56] References Cited

UNITED STATES PATENTS

| | | | |
|---|---|---|---|
| 3,461,249 | 8/1969 | Kamoji et al. | 179/100.1 VC |
| 3,269,033 | 8/1966 | Redfield et al. | 35/35 C |
| 3,405,238 | 10/1968 | Hurvitz | 179/100.2 S |
| 3,258,754 | 6/1966 | Gabor | 179/100.2 S |
| 3,251,563 | 5/1966 | Kleist et al. | 179/100.2 S |
| 3,541,271 | 11/1970 | Joslow et al. | 340/174.1 C |
| 3,624,308 | 11/1971 | Kozu | 179/100.2 S |
| 3,501,592 | 3/1970 | Waldman | 179/100.2 S |
| 3,323,230 | 6/1967 | Cooper | 179/100.2 S |

*Primary Examiner*—Bernard Konick
*Assistant Examiner*—Alfred H. Eddleman
*Attorney*—Stevens, Davis, Miller & Mosher

[57] ABSTRACT

A magnetic-recording and reproducing apparatus wherein a magnetic tape recorded with a control signal at every section of information signals, has the information signal and the control signal reproduced therefrom, such that the reproduction operation is stopped in association with the control signal, and wherein when the tape is driven in the rewind direction from the stopped state, the rewinding operation is stopped in response to the control signal reproduced in the rewinding process.

3 Claims, 2 Drawing Figures

K. MORI, A. SUGAHARA,
K. YAMAMOTO & Y. TAKEDA
INVENTORS

BY Stevens, Davis, Miller & Mosher
ATTORNEYS

MAGNETIC-RECORDING AND REPRODUCING APPARATUS WHICH IS AUTOMATICALLY PLACED IN FORWARD MODE AFTER RESPONSE TO A PREVIOUS CONTROL SIGNAL

This invention relates to magnetic-recording and reproducing apparatus, and more particularly to a magnetic-recording and reproducing apparatus constructed such that the travel of a tape is automatically stopped at every prescribed section of the tape during reproduction and on rewinding.

With a tape recorder having heretofore been used for learning and the like, the sound-recording tape is recorded with a control signal together with an aural signal in every section of the aural signal. On reproduction, the tape feed is automatically stopped after reproducing one section of the aural signal by detecting the control signal. Such a tape recorder is employed for practicing of English conversation and the like, and when one section of the aural signal is recorded with, for example, "THIS IS A PEN." Upon throwing a reproduction switch of the tape recorder "on," that part is reproduced, and then, the drive of the recorded tape is stopped by the control signal recorded after the aural signal. When a re-starting switch is subsequently thrown "on," "THAT IS A BOOK" recorded in the next section is reproduced, and the tape is similarly stopped automatically by the control signal. In a case where the sentence "THIS IS A PEN" reproduced first was not comprehended, the recorded tape is rewound by means of a rewinding lever. Since, however, the recorded tape inlcudes no visible mark, the manipulation has caused some problems in that excessive or insufficient rewinding occurs.

An object of this invention is to provide a magnetic-recording and reproducing apparatus constructed such that the travel of the tape is stopped during reproduction by detecting a control signal incorporated and recorded in every section of recorded signals, while the tape is automatically rewound to the preceding control signal as required whereby the above-mentioned problems in rewinding are eliminated.

Figure 1:
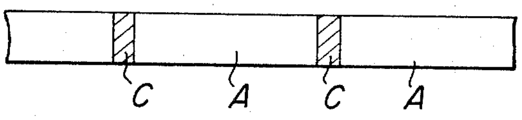
Figure 2:
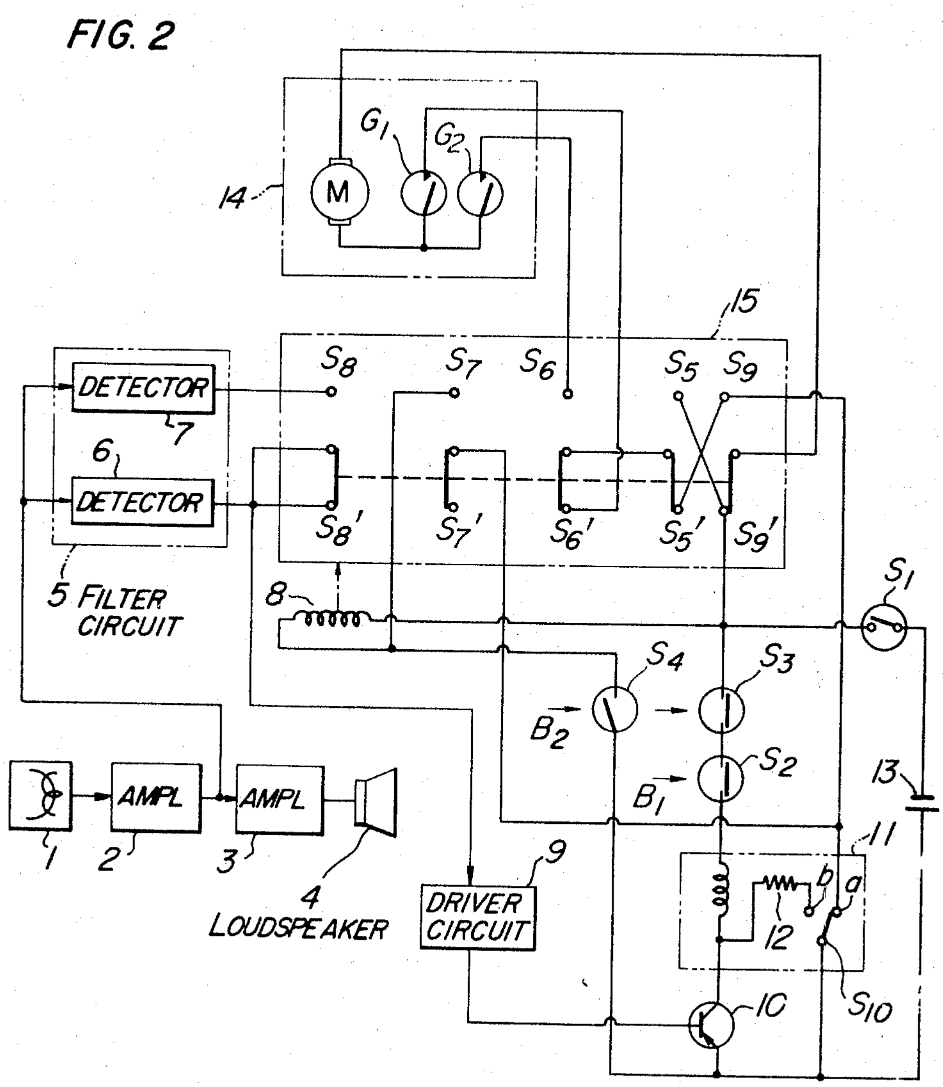

Further objects and features of this invention will be clearly understood from the following description of an embodiment taken in conjunction with the accompanying drawings, in which:

FIG. 1 is a view diagrammatically showing the recording pattern of a magnetic tape as used in this invention; and FIG. 2 is an electrical connection diagram showing an embodiment of this invention.

A magnetic recording tape for use in this invention is recorded, as shown in FIG. 1, alternately with signals A for recording and control signals C of a predetermined frequency by a well-known means of recording. Referring now to FIG. 2, the apparatus of the invention comprises a magnetic head 1, a reproducing amplifier 2, a power amplifier 3, a loudspeaker 4 for converting the recorded signal into speech, a sort of filter circuit 5 consisting of a control-signal detector circuit 6 for detecting control signals during reproduction and another control-signal detector circuit 7 for detecting control signals during rewinding, a relay 8, a driver circuit 9 including a Schmitt circuit etc. for converting an output signal of the filter circuit 5 into a driving signal for a switching transistor 10, a relay 11 driven by the switching transistor 10, a resistor 12 for controlling the self-holding current of the relay 11, a power supply 13, and a motor 14 controlled by the above circuit and for driving the sound-recorded tape. Represented at $G_1$ and $G_2$ are governors of the motor 14, of which $G_1$ is for the usual reproducing speed, while $G_2$ is for the rewinding step and has the number of revolution of the motor set larger than those during the usual reproduction. When the governing ratio is set at, for example, 4, a part of the tape having been reproduced in 4 seconds may be rewound in approximately 1 second. Reference character $S_1$ designates a power switch, while $S_2$ a contact adapted to be opened upon pressing a push button $B_1$ and serving as a switch for re-starting after reproduction is stopped. A push button $B_2$ is for rewinding the recorded tape, and when pressed, it opens a contact $S_3$ and closes a contact $S_4$ for a moment. A group of contacts 15 including the upper contacts $S_5$ to $S_9$ and the lower contacts $S_5'$ to $S_9'$, are driven by the relay 8. The contacts $S_5$, $S_5'$ and $S_9$, $S_9'$ are those for changing-over the direction of rotation of the motor 14, the contacts $S_6$, $S_6'$ are those for changing-over the governors in order to alter the rotational speed during the normal rotation and during the reverse rotation, the contacts $S_7$, $S_7'$ are those for self-holding the relay 8, and the contacts $S_8$, $S_8'$ are those for selecting the corresponding control-signal detector circuit to the tape speed during the normal rotation and during the reverse rotation. The selection does not necessarily require change-over between the entire circuits, but only change-over between contacts for components of some circuit constants may be sufficient.

The operation of the above apparatus will now be described. FIG. 2 illustrates the usual state at reproduction. A signal detected at the magnetic head 1 passes through the reproduction amplifier 2 and is amplified by the power amplifier 3 arranged at the following stage, whereupon speech is given out from the loudspeaker 4. In this case, the aural signal detected at the magnetic head 1 is not delivered towards the driver circuit 9 under the action of the filter circuit 5. When the reproduction of one section of the aural signal recorded on the sound-recording tape is completed and a control signal C is detected at the magnetic head 1, the detected signal passes through the reproducing amplifier 2. The amplified output is delivered to, besides the power amplifier 3, the control-signal detecting circuit 6 of the filter circuit 5. Then, it passes through the lower contact $S_8'$ opposite to the contact $S_8$ and renders the driver circuit 9 operative, the output of which is used to drive the switching transistor 10. Since the contacts $S_2$ and $S_3$ are normally-closed the relay 11 is energized, so that its contact $S_{10}$ moves from a contact *a* to a contact *b*. As a result, the power supply to the motor 14 is disconnected to stop the drive of the sound-recorded tape, and simultaneously, the relay self-holds through the resistor 12. When the drive of the recorded tape is thus stopped, e.g., in the study of English the listener orally repeats the reproduced voice by himself, and in another example, in the case of exercises, the listener gives answers. After such an operation, the listener presses the re-starting button $B_1$. Then, the self-holding circuit of the relay 11 is opened, the contact $S_{10}$ moves to the contact *a* side, and the section with the following aural signal recorded is subject to reproduction. In this way, the apparatus is used in the sequence of reproduction → stop → reproduction → stop . . . . In order to again reproduce, when the recorded tape is stopped, the tape part having been passed, the button $B_2$ is pressed. Then, the contact $S_3$ is opened, and hence the self-holding of the relay 11 is released. While the contact $S_{10}$ falls to the contact *a* to supply power to the motor 14, the contact $S_4$ is simultaneously closed. The relay 8 is accordingly energized, so that all the contacts of the contact group 15 are changed from the contacts $S_8'$, $S_7'$, $S_6'$, $S_5'$ and $S_9'$ over to those $S_8$, $S_7$, $S_6$, $S_5$ and $S_9$, respectively. As a result, the polarity of the voltage applied to the motor 14 is also switched over. The rotation of the motor 14 is therefore reversed, whereby the sound-recorded tape is rewound. Since the relay 8 has the contact $S_7$ for self-holding, a moment will suffice for pressing the push button $B_2$. The rewinding period is preferably short, so that the governors are changed-over by the contact $S_6$ thereby to raise the governed speed.

Simultaneously with the above, the control-signal detector circuits of the filter circuit 5 are also changed-over by means of the contact $S_8$. In a case, for example, where the recording tape is recorded with the aural signal at above 250 Hz and the control signal at the commercial frequency of, e.g., 60 Hz in terms of the frequencies at the usual speed of reproduction, the tape is rewound at a speed of four times as high as the usual speed and the aural signal is raised above 1,000 Hz while the control signal is at 240 Hz. If the apparatus is left as it is under such conditions, there will be the danger of mis-operation due to extraneous speech signals. Therefore, the control-signal detector circuit 6 used during reproduction is changed over to the control-signal detector circuit 7 by means of the contact $S_8$. When, in this state, the sound-recorded tape is rewound and the position at which the control signal is recorded is reached, the control signal of 240 Hz is detected at the magnetic head 1, and is discriminated under the action of the control-signal detector circuit 7. The switching transistor 10 is thereafter driven by means of the driver circuit 9. Then, the relay 11 is energized, the contact $S_{10}$ moved to the contact *b*, and the motor 14 is stopped. In addition, the self-holding of the relay 8 is released and the respective movable contact pieces of the group of contacts 15 return to the state in FIG. 2. Accordingly, when the push button $B_1$ is pressed, the self-holding of the relay 11 is released and reproduction is again conducted.

The reproduction in this case is one of the aural signal at the rewound part. Therefore, for the rewinding reproduction, (1) the push button $B_2$ is pressed, (2) the recorded tape is reversed, and is automatically stopped at a desired position, and (3) the push button $B_1$ is pressed. Excepting the push-buttom manipulations, all the above control operations are electrically made and with the apparatus kept in the "play" state in the mechanism. The remote control is accordingly facilitated.

While tape tension has not been referred to in the foregoing, the apparatus is of the type in which the tape is driven on both the delivery and rewinding sides.

As apparent from the above embodiment, in a magnetic-recording and reproducing apparatus wherein a magnetic tape with control signals and information signals alternately recorded has the control signal detected therefrom to temporarily stop the tape drive and wherein a holding circuit for the stop is opened through manipulation of a re-starting button to again conduct reproduction, this invention makes it possible to rotate, after the temporary stop and through the second push-button manipulation, a motor in the reverse direction to the one during the reproduction thus to offer a tape-rewinding drive, and therewith, it stops the magnetic tape at a desired position through the detection, of a control signal during rewinding.

The information signal at the desired part may accordingly be rapidly taken out, and the action therefor is to merely press a push button for a moment. Since control is made electrically, remote control is easy. Hence, when the apparatus is used in practice under the remote control, it is very simple as the listener need not keep himself close to the machine.

What is claimed is:

1. Apparatus for driving a magnetic recording medium having control signals recorded thereon in the intervals between information signals recorded thereon, comprising:

means for reproducing said control signals from said recording medium;

a drive motor for driving said recording medium selectively in forward and reverse directions;

power supply means for supplying motive power to said drive motor;

a relay operated switch interposed between said drive motor and said power supply means to control the supply of motive power to said drive motor;

a plurality of relay contacts coupled between said power supply means and said drive motor for selectively changing the polarity of voltage supplied to said motor from said power supply means;

first holding means for holding said relay operated switch in an open position to disconnect said drive motor from said power supply means in response to the detection of one of said control signals during the movement of said recording medium in a forward direction;

first switch means for disengaging said first holding means to thereby close said relay operated switch;

second switch means for disengaging said first holding means independently of said first switch means and substantially at the same time shifting said plurality of relay contacts between first and second states;

second holding means for holding said plurality of relay contacts in said second state to thereby reverse the polarity of voltage supplied to said motor compared to the first state of said relay contacts; and means coupled to said reproducing means for closing said relay-operated switch in response to the reproduction of said control signals to thereby disengage said second holding means and shift said relay contacts back to said first state.

2. The apparatus according to claim 1, further comprising means for driving said motor at first and second speeds in said forward and reverse directions, respectively; and wherein said reproducing means comprises a first filter circuit for detecting the relative frequency of said control signals at said first speed and a second filter circuit for detecting the relative frequency of said control signals at said second speed.

3. The apparatus according to claim 2, wherein said first speed is lower than said second speed.

* * * * *